United States Patent [19]

Kopecko et al.

[11] 4,336,730
[45] Jun. 29, 1982

[54] FIXTURE FOR RESURFACING VEHICLE BRAKE DISCS

[76] Inventors: William L. Kopecko, P.O. Box 183; Robert L. Fuller, 309 Alban St.; Joseph O. Duchac, Rte. 6, all of Rhinelander, Wis. 54501

[21] Appl. No.: 171,312
[22] Filed: Jul. 23, 1980
[51] Int. Cl.³ .............................................. B23B 5/04
[52] U.S. Cl. .............................. 82/4 A; 51/DIG. 3 A
[58] Field of Search ................. 82/4 A; 51/DIG. 3 A

[56] References Cited

U.S. PATENT DOCUMENTS 4,226,146 10/1980 Ekman .................................. 82/4 A

FOREIGN PATENT DOCUMENTS 2540187 3/1977 Fed. Rep. of Germany ....... 82/4 A
2745111 4/1979 Fed. Rep. of Germany ....... 82/4 A
2804840 8/1979 Fed. Rep. of Germany ....... 82/4 A

*Primary Examiner*—Leonidas Vlachos
*Attorney, Agent, or Firm*—James E. Nilles

[57] ABSTRACT

A fixture for simultaneously resurfacing opposite sides of a vehicle disc brake without removing the disc from the vehicle. The wheel of the vehicle and the hydraulic caliper for the disc are removed and the disc is then rotatably driven while opposite sides of the disc are resurfaced. A resurfacing tool fixture is removably mounted directly on the vehicle, for instance on the caliper mount bracket adjacent the disc and the fixture has a swingable frame that defines a slot and through which the disc rotatably extends. The swingable frame has a pair of opposed carbide tipped tools which engage opposite sides of the disc and which are swung across the entire surface of the disc for complete resurfacing thereof, all without removing the disc from the mounting in the vehicle.

5 Claims, 10 Drawing Figures

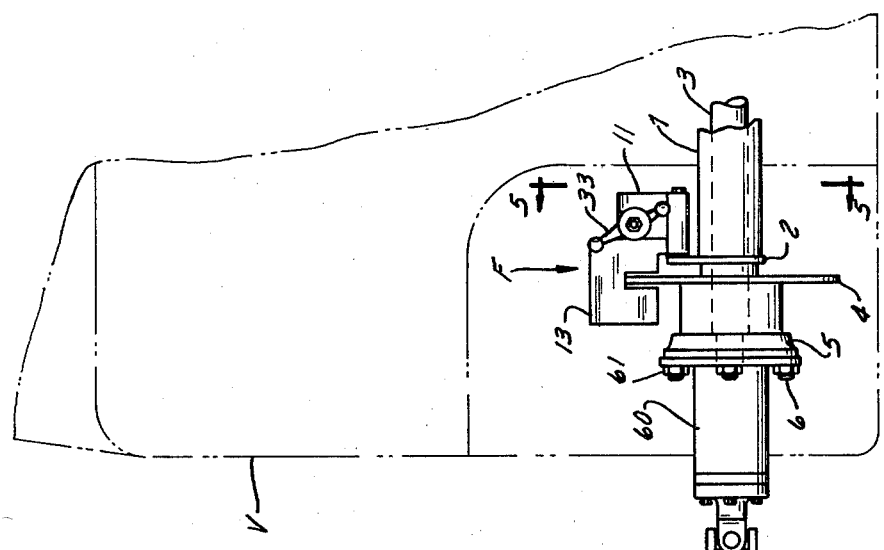
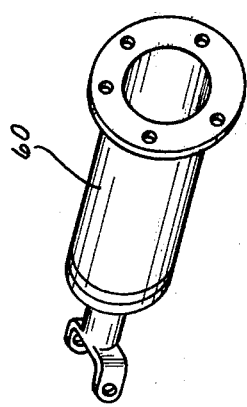
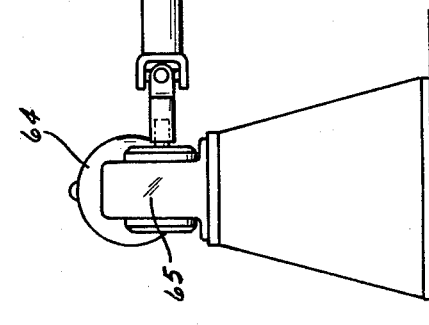

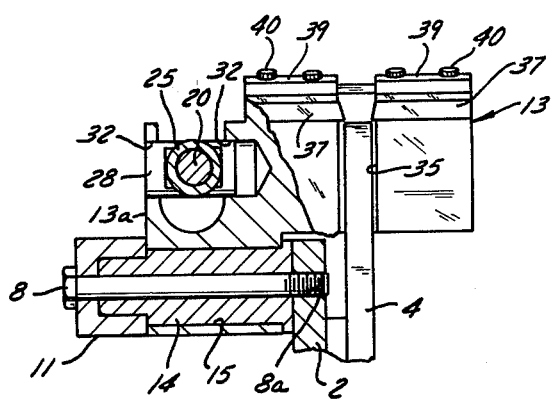
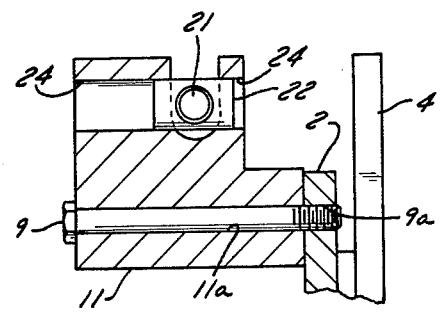
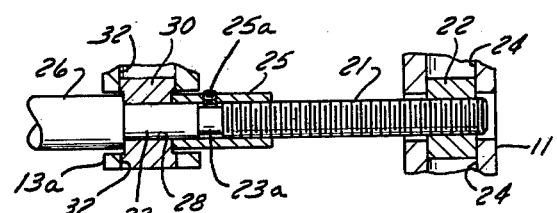
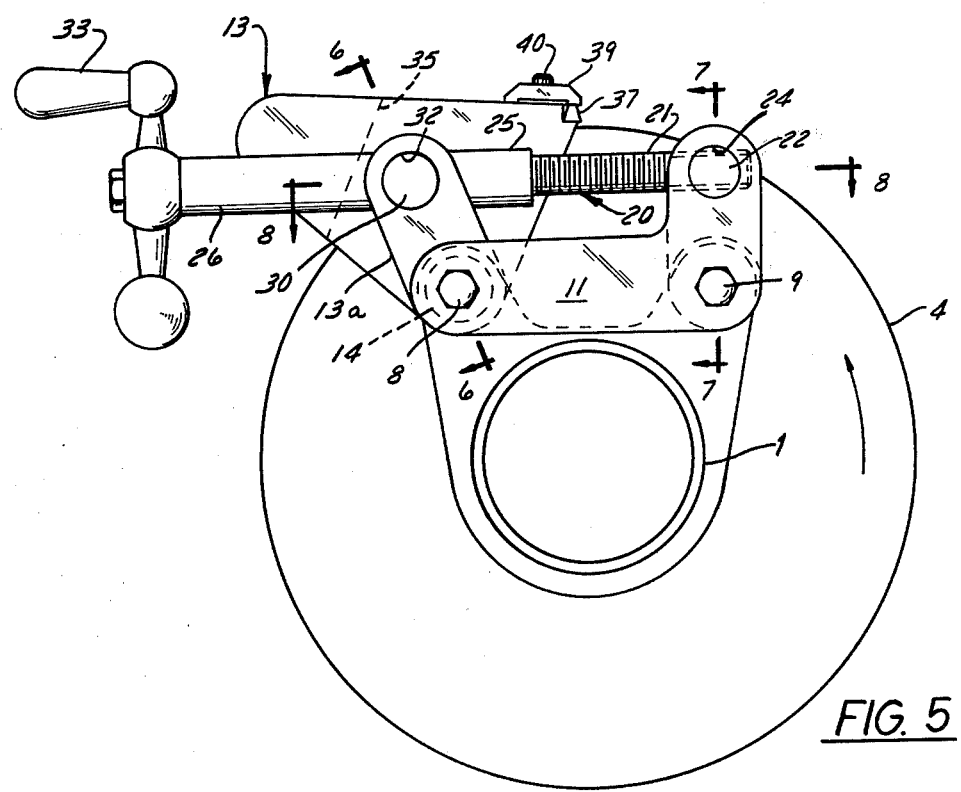

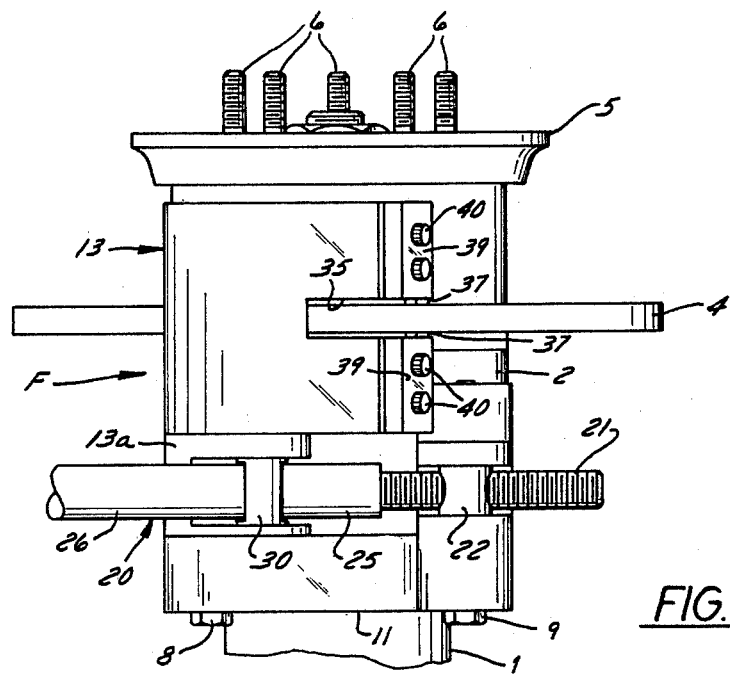
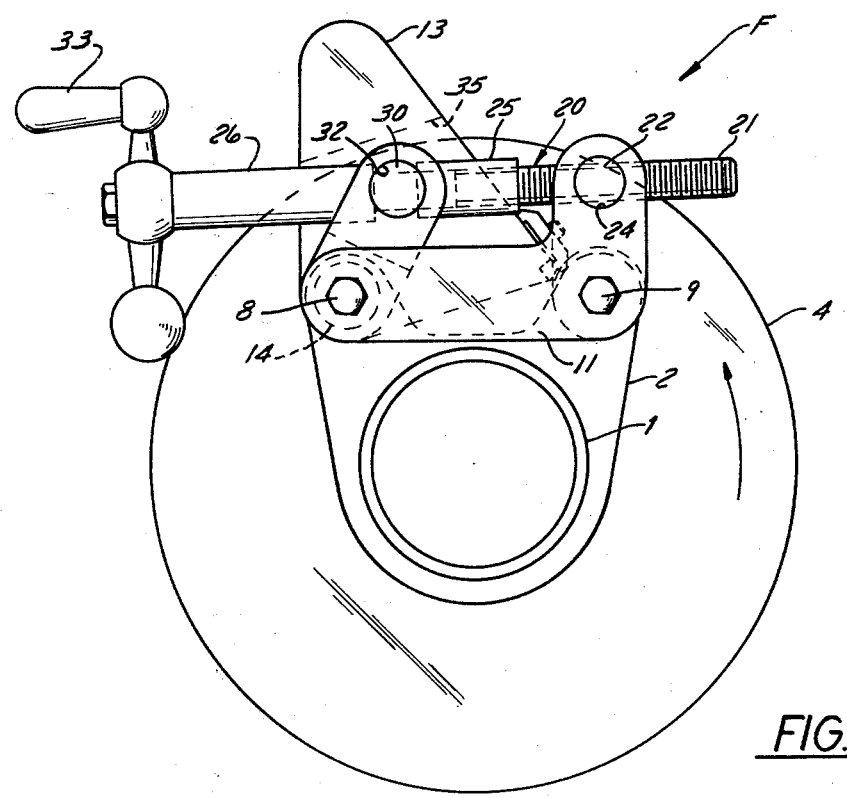
FIG. 10
FIG. 9

FIXTURE FOR RESURFACING VEHICLE BRAKE DISCS

BACKGROUND OF THE INVENTION

The invention pertains to a fixture for resurfacing brake discs of a vehicle. Various prior art devices have heretofore been proposed for simultaneously resurfacing both opposite sides of a brake disc of a vehicle. However these prior art devices have required that the brake disc be removed from the vehicle for such an operation. Examples of such prior art devices are shown in the U.S. Pat. No. 3,710,661 issued Jan. 16, 1973 wherein the disc is set up in a lathe for the resurfacing operation, and another prior art example of this type is shown in the U.S. Pat. No. 3,626,793 issued Dec. 14, 1971.

These prior art fixtures required a considerable amount of time to remachine the brake discs.

SUMMARY OF THE PRESENT INVENTION

The present invention provides a fixture for simultaneously resurfacing opposite sides of a vehicle wheel disc brake without removing the disc from the vehicle but only requiring that the wheel itself and the caliper for the disc be removed. The fixture of the present invention is removably mounted on the vehicle, for example on the caliper mount bracket of the vehicle and includes a swingable tool holder frame that has a slot that embraces the disc while the disc is rotatably driven. Tools, such as carbide tipped tools are carried by the tool holder adjacent the slot and simultaneously engage opposite sides of the disc. The tool holder frame and its tools are swung so that the tools engage and pass over the opposite sides of the disc as the latter rotates thereby resurfacing the disc while it is still in place on the vehicle. After the required number of passes are made over the disc, the fixture can be easily removed from the vehicle. A more specific aspect of the invention relates to a stationary frame of the fixture being mounted on the caliper mount bracket and also a swingable tool holder frame which can swing relative to the fixed frame, and adjustable means are provided between the frames for swinging of the swingable frame and its tools over the entire surfaces of the disc. The fixture provided by the present invention is particularly compact, easy and efficient to use, and can be readily attached and detached from a vehicle and in working relationship relative to the disc being resurfaced.

A more specific aspect of the invention relates to such a fixture wherein the disc is rotated through its live axle and driven by the power of the engine of the vehicle. In the event that the disc to be resurfaced is not driven by the engine, a separate drive means is provided for rotating the disc and this drive means includes a hub adapter which can be rigidly secured to the wheel hub and through which the disc is then rotated, for example, by a separate electric motor or other power source.

These and other objects and advantages of the present invention will appear hereinafter as this disclosure progresses, reference being had to the accompanying drawings.

BRIEF DESCRIPTION OF THE DRAWINGS

FIG. 3 is a side elevational view of the resurfacing fixture of the present invention, but on a reduced scale and showing a separate means for rotatingly driving the disc during the resurfacing operation;

FIG. 4 is a perspective view of the adapter shown in FIG. 3, but on a slightly enlarged scale;

FIG. 5 is a cross-sectional view taken generally along the line 5—5 in FIG. 3 but on an enlarged scale and showing the fixture in the position where the tools are in a retracted position, that is out of contact with the disc;

FIG. 6 is a sectional view taken along the line 6—6 in FIG. 5 and showing the pivotal mounting of the swingable frame on the caliper mount bracket;

FIG. 7 is a cross sectional view taken along the line 7—7 in FIG. 5 and showing the fixed frame of the fixture mounted on the caliper mount bracket;

FIG. 8 is a sectional view along the line 8—8 in FIG. 5 and showing the adjustable means and its connection between the swingable frame and the fixed frame; and FIG. 9 is a view similar to FIG. 5 but showing the adjustable means turned to a position wherein the swingable frame has been swung inwardly to an extent in which the tools have passed over a portion of the disc surface.

FIG. 10 is a top view of FIG. 9.

DESCRIPTION OF A PREFERRED EMBODIMENT

Figure 1:
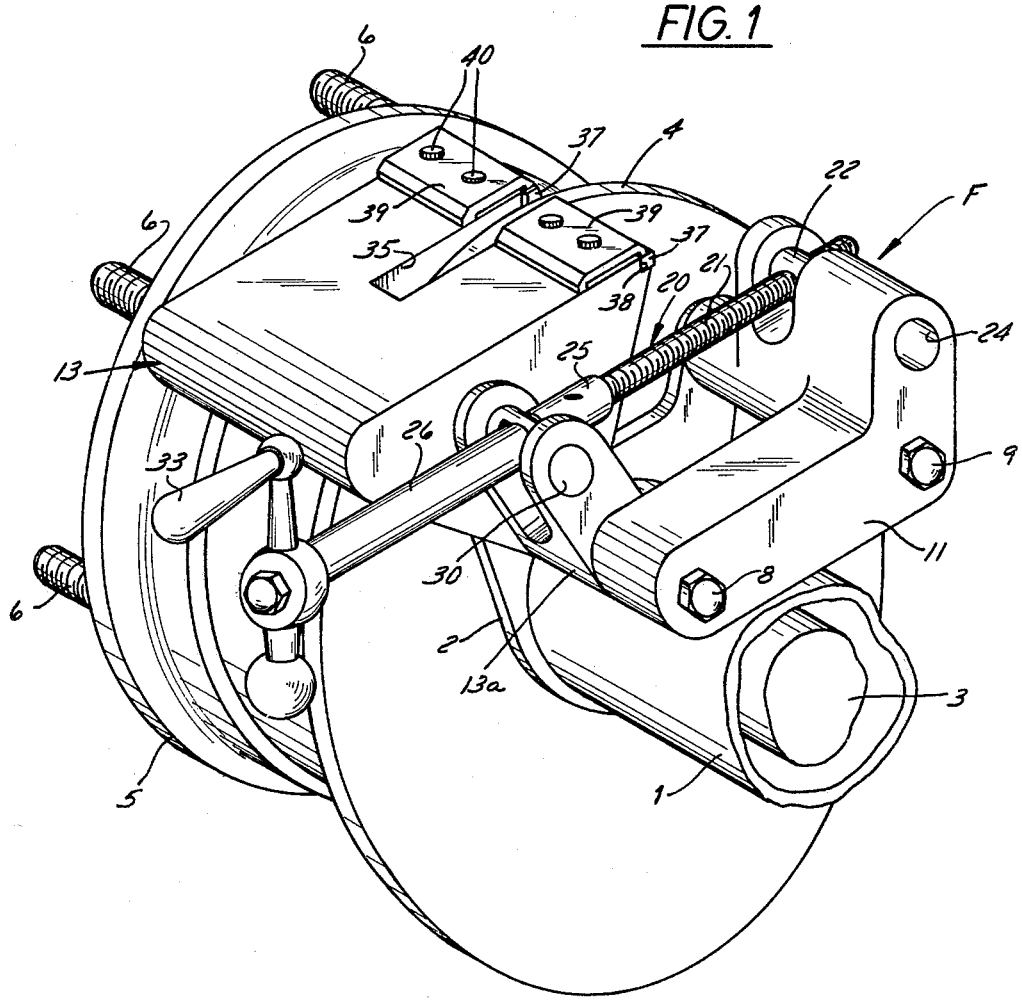
FIG. 1 is a perspective view of the fixture provided by the present invention and is mounted on the caliper mount bracket of the vehicle, the wheel of the vehicle having been removed and the axle housing and axle being shown as broken away and in section.
Figure 2:
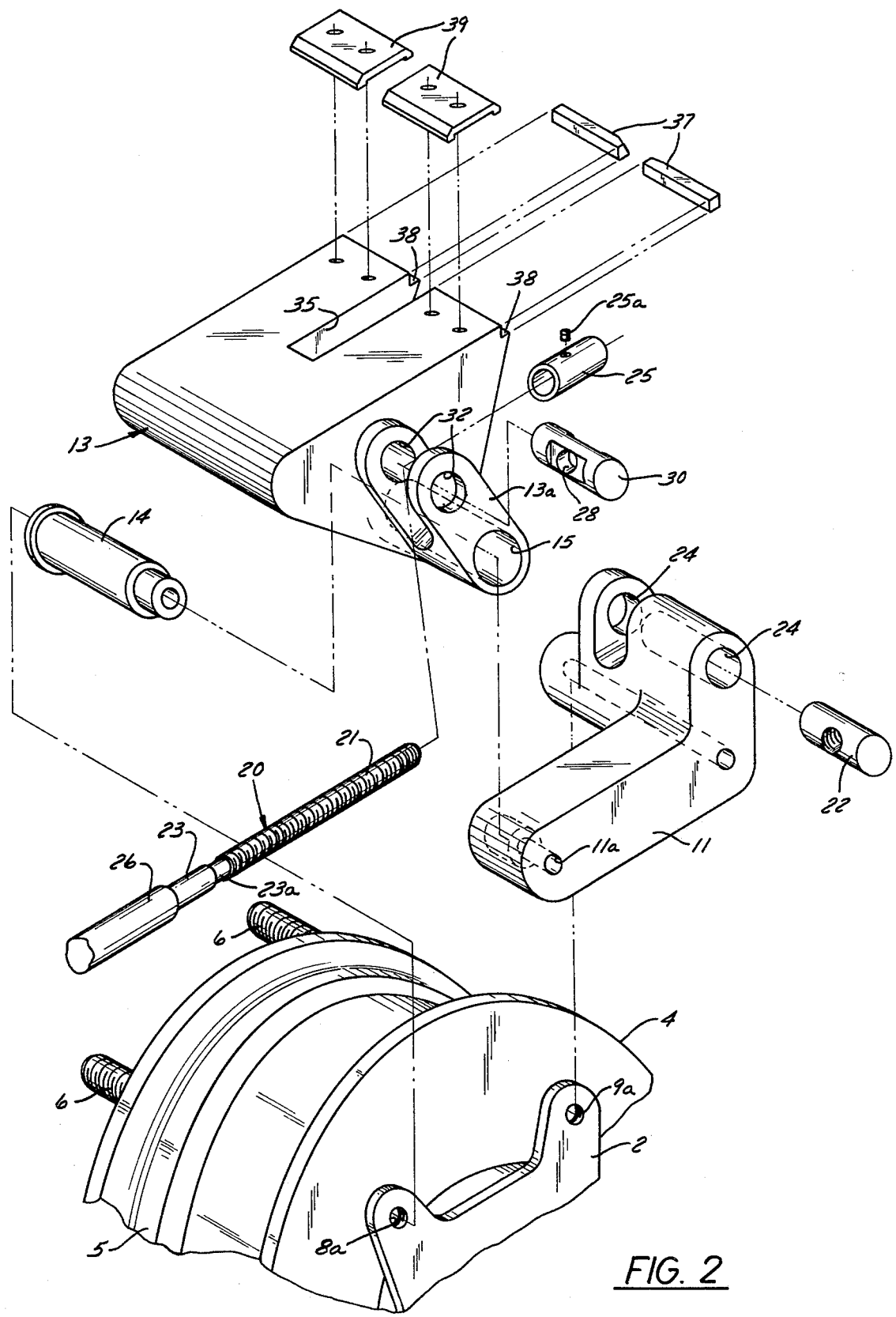
FIG. 2 is an exploded, perspective and partially fragmentary view of the fixture shown in FIG. 1.

In FIG. 3, the vehicle V has been indicated diagrammatically by the broken line and includes the axle housing 1 to which the caliper mount bracket 2 is rigidly secured. An axle 3 extends through the axle housing and the vehicle brake disc 4 is secured to that axle for rotation thereby. The disc is located adjacent the hydraulic caliper mount bracket so that the hydraulic caliper (not shown) which is otherwise mounted on the bracket 2 extends over the disc brake in the known manner. The vehicle also includes the wheel hub 5 which has threaded studs 6 extending therefrom and on which the wheel (not shown) of the vehicle is mountable in the known manner. The fixture F provided by the present invention is shown as attached to the caliper mount bracket 2 and for this purpose the two large bolts 8 and 9 (FIG. 1) extend through the fixture and are threadably engaged in the threaded holes 8a and 9a, respectively of the caliper mounted bracket 2. Holes 8a and 9a are the same holes that are used to mount the hydraulic caliper in operative relationship to the disc 4.

More specifically, the resurfacing tool fixture F includes a fixed frame 11 which is generally of L-shape and through which the bolt 9 extends to rigidly hold it on the caliper mount bracket 2. The fixture also includes a swingable frame 13 including a bifurcated off-set portion 13a that has a pivotal mounting on the vehicle, for example on the bracket 2 by means of the large bolt 8 which extends through the aperture 11a of the fixed frame 11 and a standoff-sleeve bearing 14 which in turn extends through a large aperture 15 of the swingable frame. In this manner, the swingable frame can be oscillated relative to the fixed frame and relative to the adjacent disc 4.

An adjustable means is provided for swinging the swingable frame relative to the fixed frame and relative to the disc as follows. A manually rotatably and elongated threaded member 20 has a threaded portion 21 that is threadably engaged in an internally threaded bushing 22 that is mounted in the aperture 24 formed in the fixed housing 11. The elongated threaded member 20 also includes a rod 26 that can rotate relative to the threaded portion 21 as clearly shown in FIG. 8. The rod 26 is rotatably mounted in a bore 28 in the swivel 30 which in turn is mounted in the aperture 32 of the bifurcated portion 13a of the swingable frame 13. A hand crank 33 is fixed to the elongated end of the threaded member so that the operator can rotate the crank which in turn causes rotation of the threaded portion 21 and consequent travel of the threaded member 22 therealong. Because the frame 11 is fixed, rotation of the crank 33 causes the swingable frame 13 to swing in one direction or the other relative to the fixed frame 11 and relative to the disc 4. As shown in FIG. 5, the crank 33 has been turned to a position in which the swingable frame has been retracted whereas FIG. 9 shows the position of the swingable frame 13 when in the disc resurfacing position as will appear.

The swingable frame defines a slot 35 which extends partially through the swingable frame and is arranged so that the disc 4 is engagable in the slot as the swingable frame is swung relative to the disc. A pair of cutting tools in the form of carbide tool bits 37 are set in the recesses 38 located along the edge of the swingable frame and are held captive therein by clamps 39 and the cap bolts 40 that are threadably engaged in the swingable member. The inner ends of the bits are set to contact the opposite surfaces of the disc so that as the swingable frame and its tools are swung from the position shown in FIG. 5 and inwardly to a position shown in FIG. 9, the tools will resurface the sides of the discs. The swingable frame 13 can be swung inwardly further from that shown in FIG. 9 so as to completely move across the entire surface of the disc.

It will be noted that the swingable frame is made with a slot 35 and thereby results in a one-piece frame which is of particularly rigid construction and which enables an accurate and even cut simultaneously on both sides of the disc. The cutting tools can be adjusted relative to the sides of the disc to furthermore ensure accurate resurfacing.

The present invention is useable in situations where the discs are power driven by the engine of the vehicle through the live axle and can also be used where the axle is not driven, but in that case the driving means of FIG. 3 would be utilized. That driving means includes a hub adapter 60 which is secured by nuts 61 to the hub studs 6 and which is connected by the telescoping double universal joint shaft 62 to a source of power such as for example a one-third horsepower electric motor 64 that drives the shaft through the gear reducer 65.

With the present invention, an auto service mechanic can remachine the caliper disc without removing the disc hub from the vehicle.

The present invention thus provides a fixture for simultaneously resurfacing opposite sides of a vehicle wheel disc brake and without removing the disc from the vehicle. It is only necessary to remove the wheel and also the hydraulic caliper, leaving the caliper mount bracket in place. The mount bracket forms a convenient and accurate member for securing the fixture of the present invention in place. The disc can be rotated either by an auxiliary power source or by the engine on the vehicle itself while the operator turns the crank to swing the tools across both surfaces of the disc being resurfaced.

The entire fixture can be easily and quickly attached to the vehicle frame and removed therefrom when the resurfacing operation is completed.

We claim:

1. A resurfacing tool fixture for simultaneous resurfacing opposite sides of a brake disc of a wheel of a vehicle without removing said disc from said vehicle but when said wheel has been removed; said fixture comprising a swingable tool holder frame, means for pivotally mounting said frame on said vehicle, adjustable means for swinging said swingable frame relative to said disc, a pair of cutting tools carried by said swingable tool holder frame, one on each side of said disc for simultaneous cutting contact with opposite sides of said disc as said swingable frame is swung by said adjustable means.

2. A resurfacing tool fixture for simultaneous resurfacing opposite sides of a brake disc of a wheel of a vehicle without removing said disc from said vehicle but when said wheel has been removed; said fixture comprising a fixed frame rigidly and removably mounted on said vehicle, a swingable tool holder frame having a pivotal mounting on said fixed frame, adjustable means for swinging said swingable tool holder frame relative to said fixed frame and said disc, said swingable tool holder frame defining a slot therein for receiving said disc in said slot, a pair of cutting tools carried by said swingable tool holder frame, one on each side of said slot and adjacent said disc for simultaneous cutting contact with opposite sides of said disc as said swingable tool holder frame is swung about its pivotable mounting by actuation of said adjustable means.

3. The tool fixture set forth in claim 2 further characterized in that said adjustable means includes a manually rotatable and elongated threaded member, said member having a threaded connection with one of said frames and rotationally supported in the other of said frame whereby rotation of said adjustable means in either direction causes swinging of said swingable frame.

4. A resurfacing tool fixture for simultaneous resurfacing both of the opposite sides of a brake disc of a wheel of a vehicle without removing said disc from said vehicle but when said wheel has been removed, said vehicle having a caliper mount bracket adjacent said disc for removably mounting a caliper brake thereon, said fixture comprising a fixed frame, means for rigidly and removably mounting said frame on said caliper mount bracket when said caliper brake has been removed from said bracket, a swingable tool holder frame having means for being pivotally mounted on said fixed frame, adjustable means connected between said fixed frame and said swingable frame for swinging the latter relative to said fixed frame and said disc, said swingable frame defining a slot therein for receiving said disc in said slot, a pair of cutting tools carried by said swingable tool holder frame and locatable one on each side of said slot and adjacent said discs for simultaneous cutting contact with opposite sides of said disc as said swingable frame is swung on said fixed frame about its pivotable mounting by actuation of said adjustable means.

5. The tool fixture set forth in claim 4 further characterized in that said adjustable means includes a manually rotatable and elongated threaded member, said member having a threaded connection with one of said frames and rotationally supported in the other of said frame whereby rotation of said adjustable means in either direction causes swinging of said swingable frame.

* * * * *